US012057658B2

(12) United States Patent
Scanzillo et al.

(10) Patent No.: US 12,057,658 B2
(45) Date of Patent: Aug. 6, 2024

(54) ELECTRICAL CONTACT DEVICE WITH INTERLOCK

(71) Applicant: Hubbell Incorporated, Shelton, CT (US)

(72) Inventors: Thomas Scanzillo, Monroe, CT (US); Edward Bazayev, Kew Gardens, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/325,509

(22) Filed: May 30, 2023

(65) Prior Publication Data

US 2023/0307868 A1 Sep. 28, 2023

Related U.S. Application Data

(63) Continuation of application No. 17/121,002, filed on Dec. 14, 2020, now Pat. No. 11,682,857, which is a (Continued)

(51) Int. Cl.
*H01R 13/62* (2006.01)
*H01F 7/06* (2006.01)
(Continued)

(52) U.S. Cl.
CPC ......... *H01R 13/6205* (2013.01); *H01F 7/064* (2013.01); *H01F 7/16* (2013.01);
(Continued)

(58) Field of Classification Search
CPC .............. H01R 13/703; H01R 13/7036; H01R 13/7037; H01R 13/7175; H01R 13/665;
(Continued)

(56) References Cited

U.S. PATENT DOCUMENTS 8,376,767 B2 2/2013 Kahara et al.
8,523,596 B2 9/2013 Inoue et al.
(Continued)

OTHER PUBLICATIONS

International Search Report and Written Opinion issued in PCT/US2018/047316 on Dec. 18, 2018. (14 pages).

*Primary Examiner* — Gary F Paumen
(74) *Attorney, Agent, or Firm* — Robinson + Cole LLP

(57) ABSTRACT

An electrical connector assembly includes a first electrical contact device and a second electrical contact device. The first electrical contact device includes at least one first electrical contact and an actuator movable between a first position and a second position. The second electrical contact device includes at least one second electrical contact device and an interlock feature to engage the actuator when the actuator is in the first position. The actuator is in the first position when the first electrical contact is in electrical communication with a power source, and the actuator is in the second position when the electrical communication between the first electrical contact and the power source is disconnected. When the actuator is in the first position and the second electrical contact engage the first electrical contact, the interlock feature engages the actuator, thereby securing the first electrical contact device and the second electrical contact device against disconnection.

20 Claims, 17 Drawing Sheets

Related U.S. Application Data continuation of application No. 16/107,440, filed on Aug. 21, 2018, now Pat. No. 10,868,389.

(60) Provisional application No. 62/665,226, filed on May 1, 2018, provisional application No. 62/548,176, filed on Aug. 21, 2017.

(51) Int. Cl.

| | |
|---|---|
| ***H01F 7/16*** | (2006.01) |
| ***H01R 13/512*** | (2006.01) |
| ***H01R 13/627*** | (2006.01) |
| ***H01R 13/66*** | (2006.01) |
| ***H01R 13/703*** | (2006.01) |
| ***H01R 13/717*** | (2006.01) |
| ***H01R 24/20*** | (2011.01) |
| ***H01R 24/28*** | (2011.01) |
| ***H01R 43/26*** | (2006.01) |
| ***H01R 103/00*** | (2006.01) |

(52) U.S. Cl.

CPC ....... *H01R 13/6278* (2013.01); *H01R 13/665* (2013.01); *H01R 43/26* (2013.01); *H01R 13/512* (2013.01); *H01R 13/7037* (2013.01); *H01R 13/7038* (2013.01); *H01R 13/7175* (2013.01); *H01R 24/20* (2013.01); *H01R 24/28* (2013.01); *H01R 2103/00* (2013.01)

(58) Field of Classification Search

CPC .... H01R 2103/00; H01R 13/00; H01R 13/04; H01R 13/53; H01R 13/62; H01R 13/6205; H01R 13/6278; H01R 13/629; H01R 13/62905; H01R 13/62927; H01R 13/62983; H01R 13/631; H01R 13/633; H01R 13/635; H01R 13/639; H01R 13/70701; H01R 43/26; H01R 24/20; H01R 24/28; H01F 7/06; H01F 7/064; H01F 7/16; H01F 2007/062

See application file for complete search history.

(56) References Cited

U.S. PATENT DOCUMENTS

| | | | | |
|---|---|---|---|---|
| 8,672,228 | B1 | 3/2014 | Saini | |
| 8,708,728 | B2 | 4/2014 | Hirashita et al. | |
| 8,968,021 | B1 | 3/2015 | Kennedy et al. | |
| 9,147,548 | B2 | 9/2015 | Bonasia et al. | |
| 9,225,109 | B2 | 12/2015 | Sasaki et al. | |
| 9,238,417 | B2 | 1/2016 | Führer | |
| 9,252,539 | B2 | 2/2016 | Condo et al. | |
| 9,281,618 | B2 | 3/2016 | Kurumizawa et al. | |
| 9,365,125 | B2 | 6/2016 | Seelig et al. | |
| 9,391,401 | B2 | 7/2016 | Natter et al. | |
| 9,478,909 | B2 | 10/2016 | Shimizu et al. | |
| 9,533,586 | B2 | 1/2017 | Kahara et al. | |
| 9,776,521 | B2 | 10/2017 | Lopez et al. | |
| 9,812,820 | B2 | 11/2017 | Takagi | |
| 9,819,118 | B2 | 11/2017 | Juds et al. | |
| 9,887,489 | B1 | 2/2018 | Dietz et al. | |
| 10,003,163 | B2 | 6/2018 | Hewitt et al. | |
| 10,259,330 | B2 | 4/2019 | Eisner et al. | |
| 10,263,370 | B2 | 4/2019 | Condo et al. | |
| 10,868,389 | B2 | 12/2020 | Scanzillo et al. | |
| 11,682,857 | B2 * | 6/2023 | Scanzillo | H01R 13/6205 439/39 |
| 2002/0052134 | A1 | 5/2002 | Revis | |
| 2013/0241678 | A1 | 9/2013 | Bonasia et al. | |
| 2014/0184158 | A1 | 7/2014 | Osawa et al. | |
| 2014/0285148 | A1 | 9/2014 | Osawa et al. | |
| 2014/0292276 | A1 | 10/2014 | Osawa et al. | |
| 2017/0098908 | A1 | 4/2017 | Juds et al. | |
| 2019/0115693 | A1 | 4/2019 | Troeger et al. | |
| 2019/0192769 | A1 | 6/2019 | Tallarida et al. | |

* cited by examiner

ELECTRICAL CONTACT DEVICE WITH INTERLOCK

REFERENCE TO RELATED APPLICATIONS

This application claims the benefit of co-pending U.S. patent application Ser. No. 17/121,002, filed Dec. 14, 2020, which claims the benefit of U.S. patent application Ser. No. 16/107,440, filed Aug. 21, 2018, which claims the benefit of U.S. Provisional Patent Application No. 62/548,176, filed Aug. 21, 2017, and U.S. Provisional Patent Application No. 62/665,226, filed May 1, 2018. The entire contents of these applications are incorporated by reference herein.

FIELD

The present disclosure relates to electrical contact devices, and particularly to electrical contact devices with locking mechanisms.

SUMMARY

Electrical and communication cable connections include a male connector and a female connector receiving the male connector. In some circumstances, a lock mechanism may secure the connectors and prevent improper disconnection that may lead to injury.

In one aspect, an electrical connector assembly includes a first electrical contact device and a second electrical contact device. The first electrical contact device includes at least one first electrical contact and an actuator movable between a first position and a second position. The actuator is in the first position while the at least one first electrical contact is in electrical communication with a power source and the second position while the electrical communication between the at least one first electrical contact and the power source is disconnected. The second electrical contact device includes at least one second electrical contact and a connector to engage the actuator when the actuator is in the first position and the at least one second electrical contact engages the at least one first electrical contact. The engagement of the connector and the actuator secures the first electrical contact device and the second electrical contact device against disconnection.

In another aspect, an electrical connector assembly includes a first electrical contact device and a second electrical contact device. The first electrical contact device includes at least one first electrical contact and a solenoid including a plunger movable between a first position and a second position. The plunger is in the first position while the at least one first electrical contact is in electrical communication with a power source and the second position while the electrical communication between the at least one first electrical contact and the power source is disconnected. The second electrical contact device includes at least one second electrical contact and a hole to engage the plunger when the plunger is in the first position and the at least one second electrical contact engages the at least one first electrical contact. The engagement of the hole and the plunger secures the first electrical contact device and the second electrical contact device against disconnection.

In yet another aspect, a method for selectively connecting a first electrical contact device and a second electrical contact device includes: verifying that a power source is not in electrical communication with the first electrical contact device; if the power source is not in electrical communication with the first electrical contact device, engaging electrical contacts of the first electrical contact device with electrical contacts of the second electrical contact device along a translational direction; and supplying electrical current from the power source to the first electrical contact device, thereby driving an actuator to move from a second position to a first position to engage a connector in the second electrical contact device and securing the first electrical contact device and the second electrical contact device against disconnection.

In still another aspect, an electrical connector includes a housing, at least one electrical contact positioned in the housing, and at least one rib extending laterally around a periphery of the housing.

The above-described and other features and advantages of the present disclosure will be appreciated and understood by those skilled in the art from the following detailed description and drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
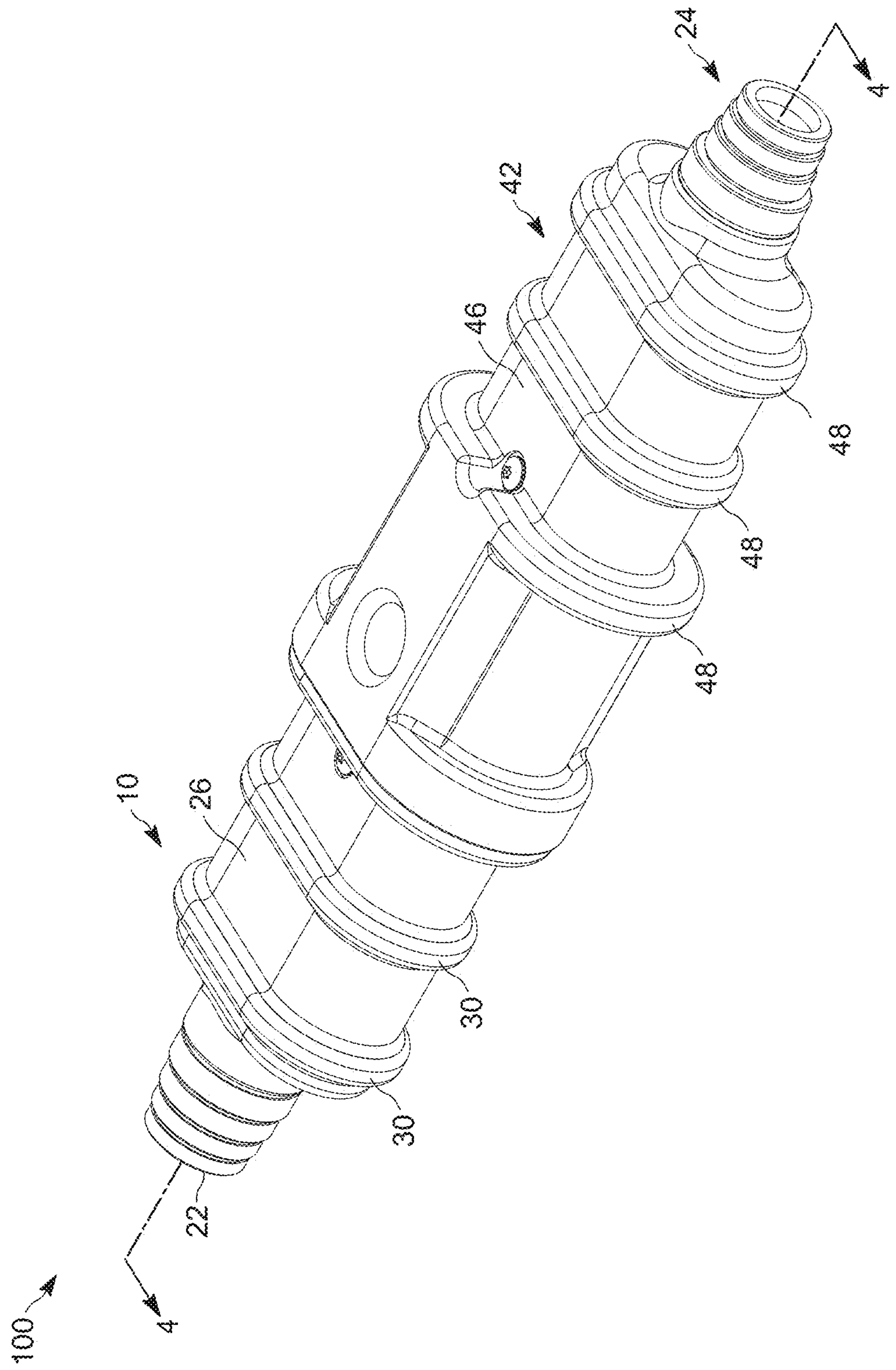
FIG. 1 is a perspective view of a connector assembly.

FIG. 1 shows a perspective view of a connector assembly 100, including a first connector or female connector 10 and a second connector or male connector 42. In the illustrated embodiment, a first insulator housing 26 encases the female connector 10. A plurality of first ribs 30 on the first insulator housing 26 extend laterally around a periphery of the first insulator housing 26 and may assist in withstanding abuse and/or impact load. Likewise, a second insulator housing 46 encases the male connector 42. A plurality of second ribs 48 on the second insulator housing 46 extend laterally around the periphery of the second insulator housing 46 and may assist in withstanding abuse and/or impact load. In addition, the material of the connectors 10, 42 near the interface can be formed of a resilient material (e.g., rubber) to provide a seal and inhibit contamination/corrosion. Electrical current is transmitted from a power source (not shown) through a first conductive wire device or cord 22 connected to the female connector 10, to the male connector 42 and through a second conductive wire device or cord 24 connected to the male connector 42, and ultimately to power a load (not shown).

Figure 2:
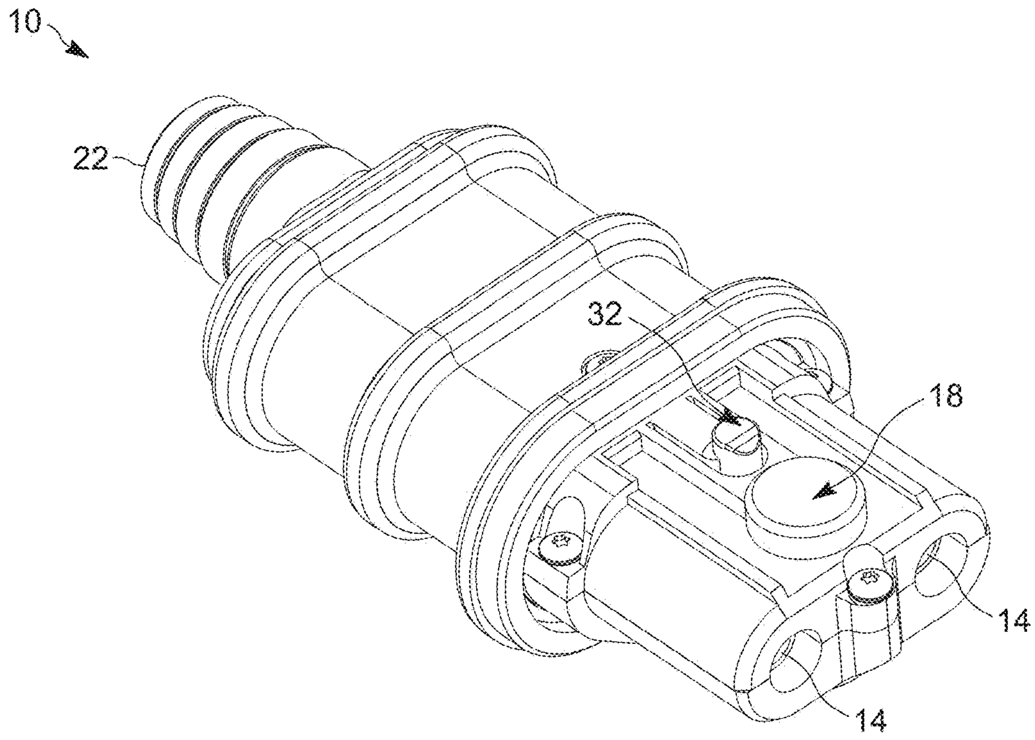
FIG. 2 is a perspective view of a female connector of FIG. 1.

As shown in FIG. 2, the female connector 10 includes first electrical contacts 14 and an actuator 18. In the illustrated embodiment, the female connector 10 includes two electrical contacts 14; in other embodiments, the female connector 10 may include fewer or more electrical contacts. Also, in the illustrated embodiment the actuator 18 is positioned on the female connector between the first contacts 14; in other embodiments, the actuator 18 may be positioned in another location (e.g., in a position other than between the electrical contacts, or on the male connector 42 in a configuration in which the male connector is directly coupled to a power source and the female connector is directly coupled to a load). The first electrical contacts 14 are in electrical communication with a power source (not shown) via the first cord 22.

A secondary latch 34 further mechanically secures the female connector 10 to the male connector 42. In the illustrated embodiment, the latch 34 includes a cantilevered tab 32 positioned on the female connector 10 and is resiliently biased to protrude from an outer surface of the female connector 10 to engage an opening 36 (FIG. 4) positioned on the male connector 42. The latch 34 may be mechanically unlocked by depressing the tab 32 or pushing the tab 32 towards a center of the electrical connector assembly 100. Other embodiments may include mechanical latches using different engagement mechanisms.

Figure 3:
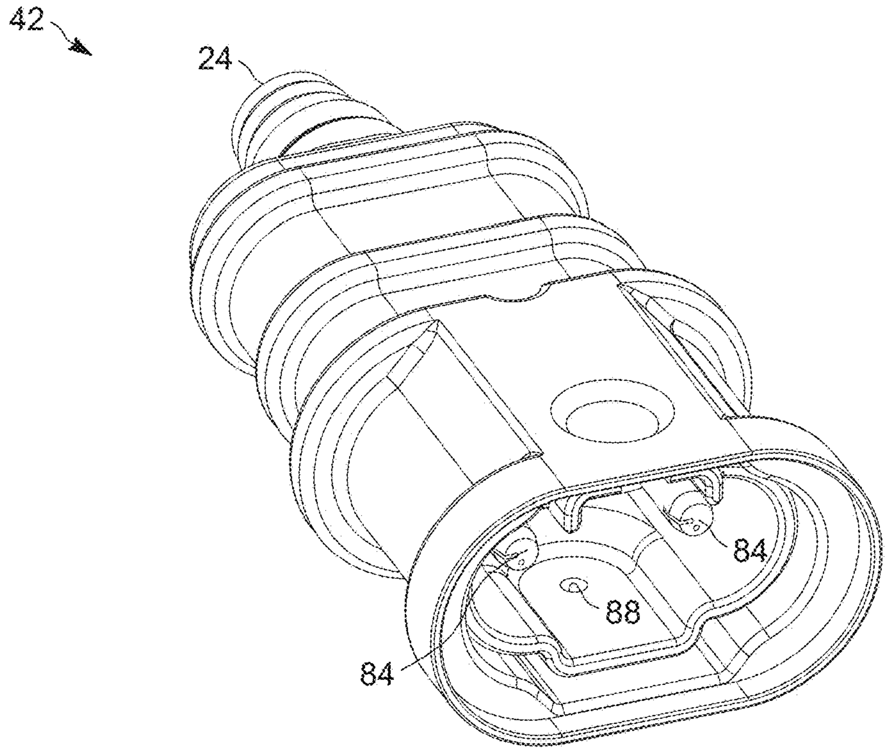
FIG. 3 is a perspective view of a male connector of FIG. 1.

As shown in FIG. 3, the male connector 42 includes second electrical contacts 84 and an interlock feature 88. The second electrical contacts 84 correspond to the first electrical contacts 14. In the illustrated embodiment, the male connector 42 includes two electrical contacts 84; in other embodiments, the male connector 42 may include fewer or more electrical contacts. The second electrical contacts 84 engage the first electrical contacts 14 to provide electrical communication between the female connector 10 and the male connector 42, supplying power to a load (not shown) via a second conductive cord 24.

Figure 4:
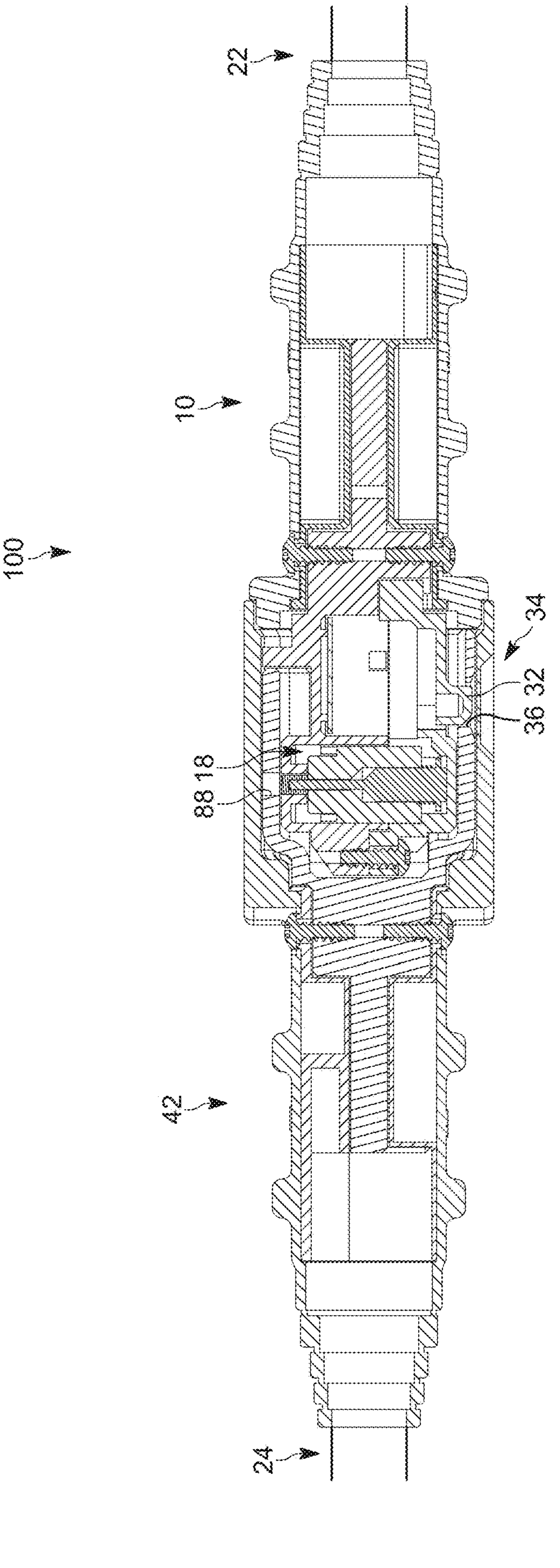
FIG. 4 is a cross-sectional view of a connector assembly of FIG. 1 viewed along section 1-1.
Figure 5A:
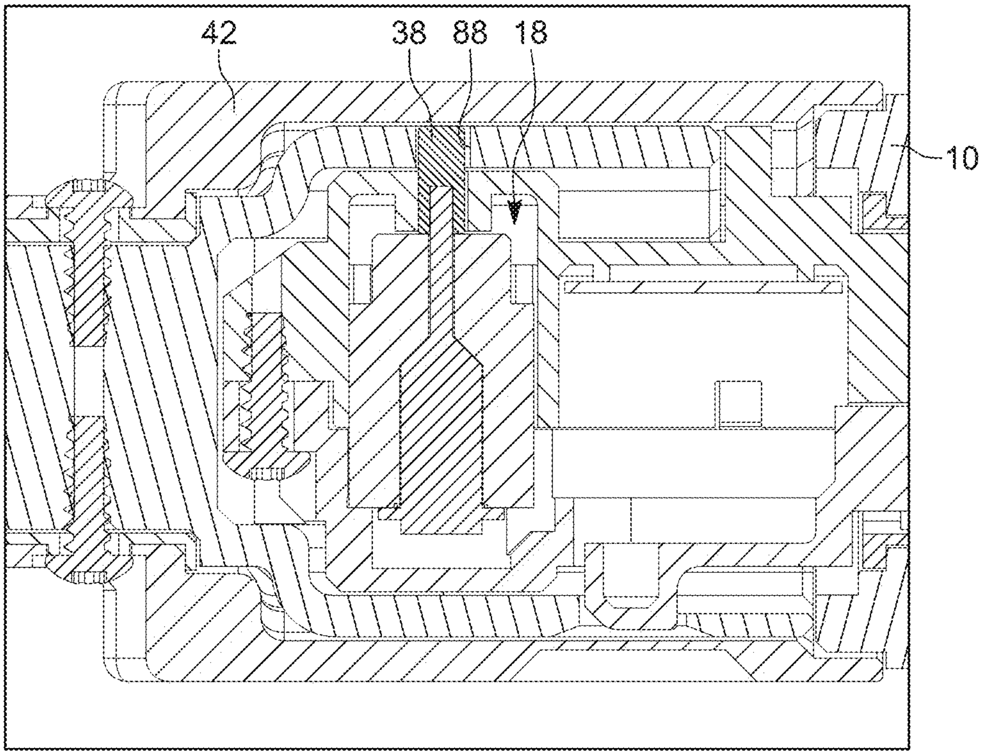
FIG. 5A is an enlarged cross-sectional view of the connector assembly of FIG. 4, with an actuator in a first position.
Figure 5B:
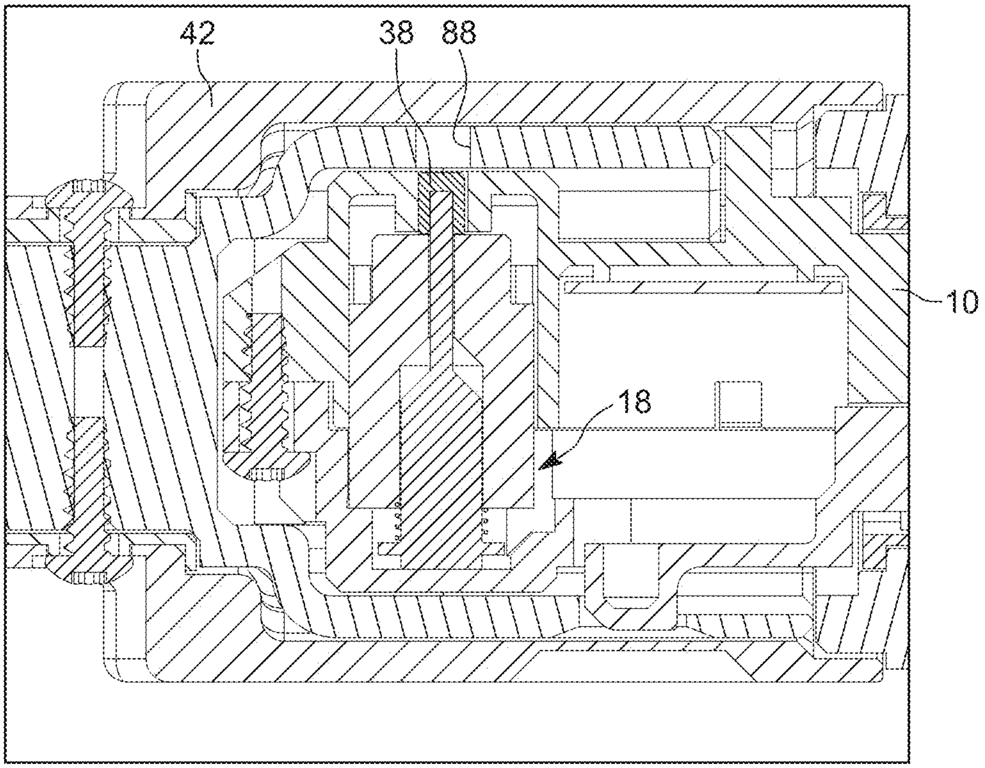
FIG. 5B is an enlarged cross-sectional view of the connector assembly of FIG. 4, with the actuator in a second position.
Figure 6:
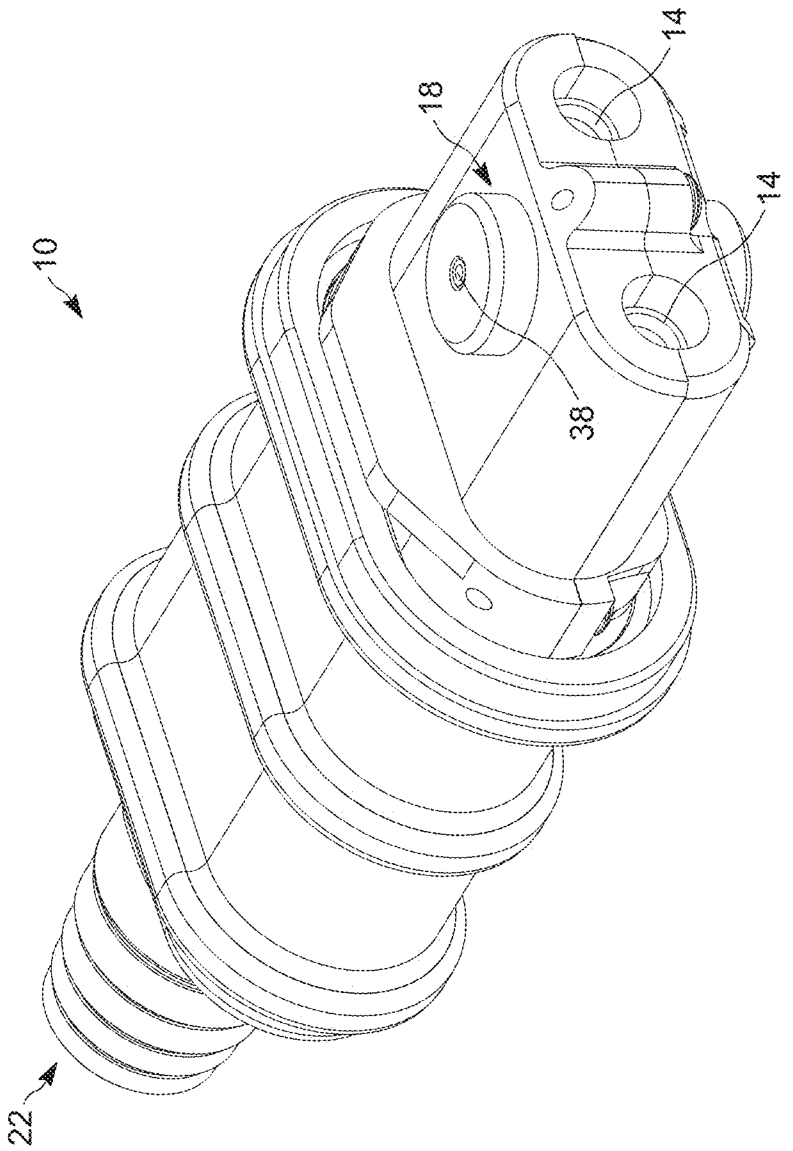
FIG. 6 is a perspective view of the female connector of FIG. 2.
Figure 21:
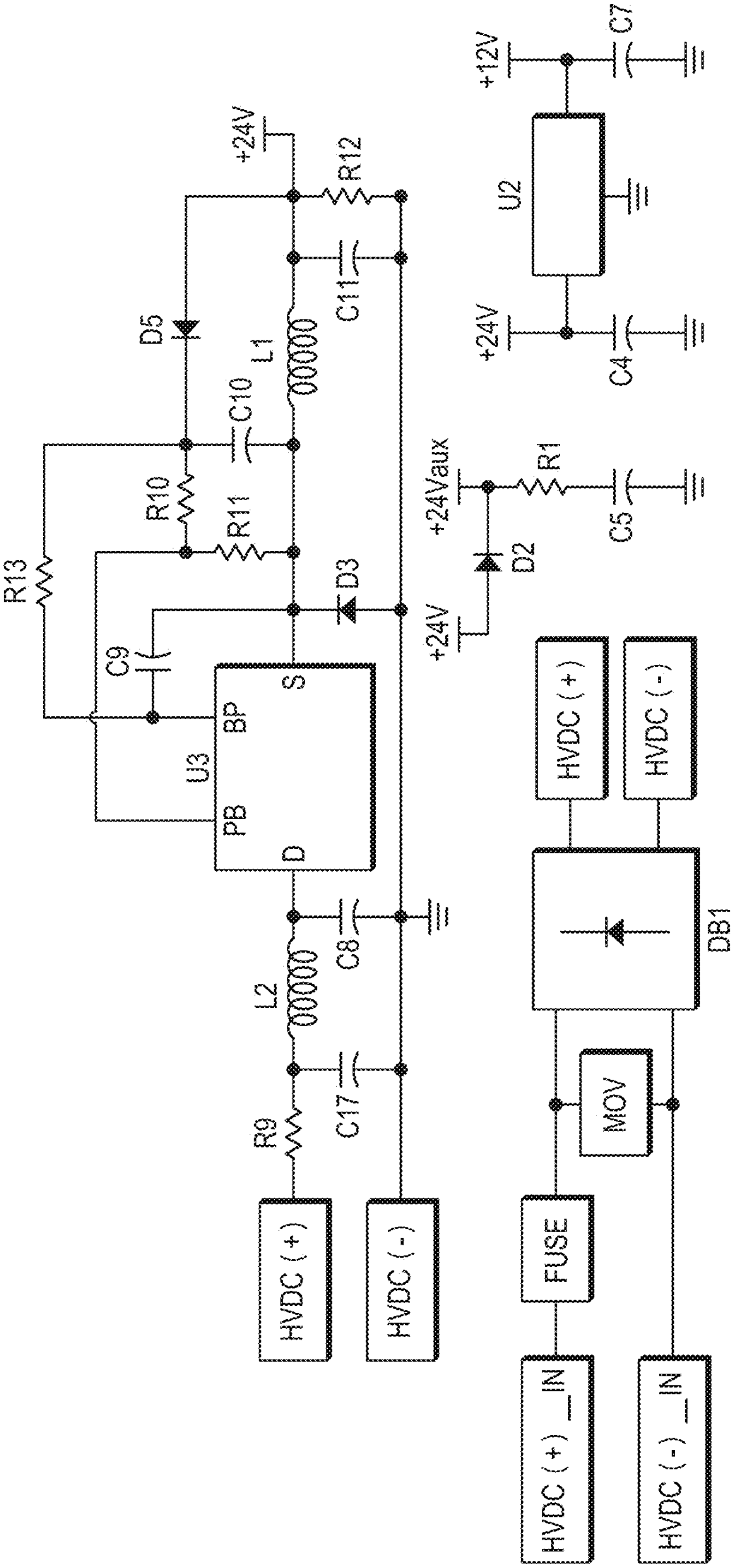
FIGS. 21 and 22 are schematic views of an exemplary auxiliary circuit.
Figure 22:
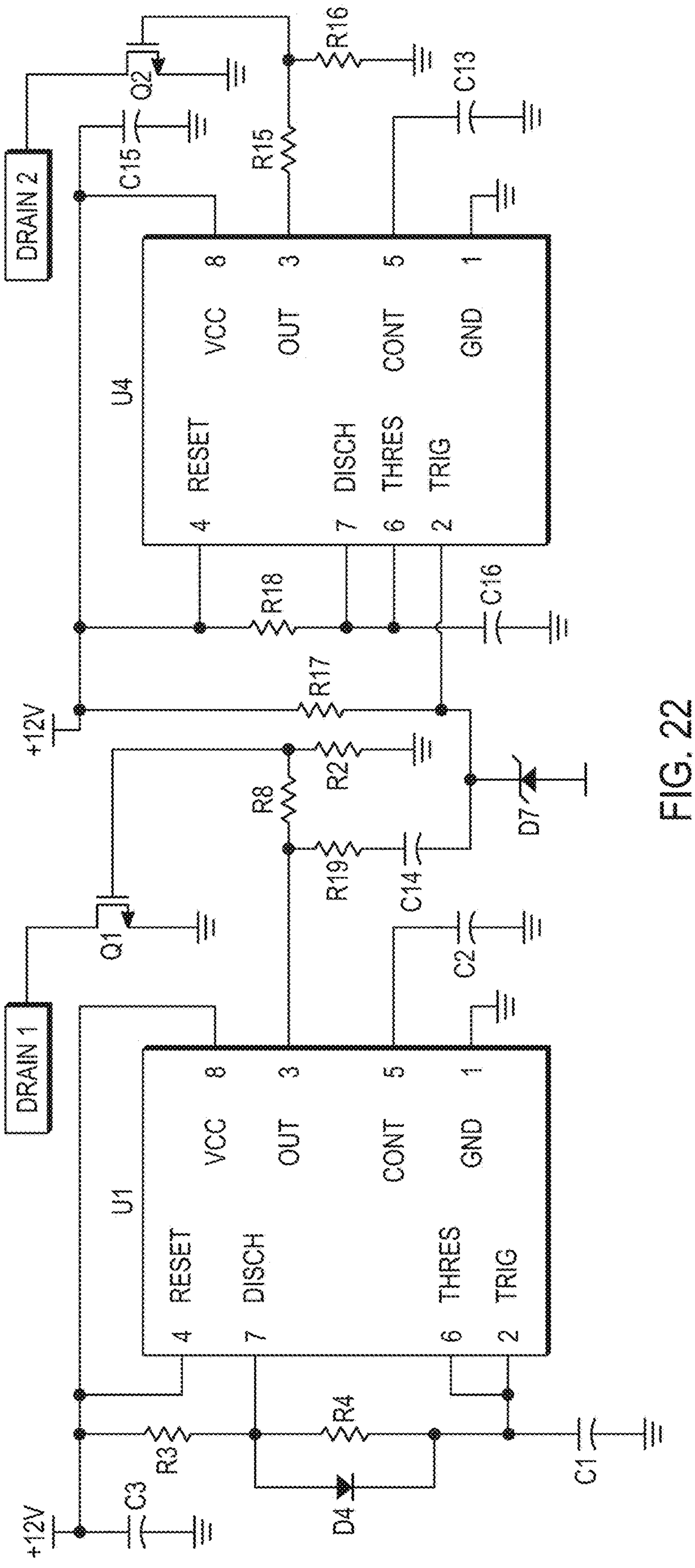

Referring to FIGS. 4, 5A, and 5B, the actuator 18 is movable between a first position (FIG. 5A) and a second position (FIGS. 4 and 5B). In the illustrated embodiment, the actuator 18 is an electric solenoid, and the first position is an energized or extended position while the second position is a de-energized or retracted position. The first electrical contacts 14 (FIG. 2) are in electrical communication with a power source (not shown) via the first conductive cord 22. The actuator 18 is in electrical communication with the first electrical contacts 14 via an auxiliary circuit. An example of the auxiliary circuit is shown in FIGS. 21 and 22. In some embodiments, the auxiliary circuit includes at least one resistor to step-down the power from the power source before delivering the power to the actuator 18. Also, in some embodiments the circuit is capable of withstanding a back electro-motive force (EMF) of up to 1600 volts (e.g., due to a polarity change in a magnet's operation). In some embodiments, the auxiliary circuit pulses the actuator 18 to ensure the actuator 18 remains in the energized position in case a shock event would cause the actuator 18 to change its state. In other embodiments, the circuit may be configured in other ways.

As a result, when the power source is energized to supply power to the first electrical contacts 14, the actuator 18 draws current from the first electrical contacts 14 and that actuator 18 is energized and moves to the first position (FIG. 5A). If the female connector 10 and the male connector 42 are coupled to one another when the power source is activated to supply power to the first electrical contacts 14 (FIG. 2) are energized, the actuator 18 will extend to engage the interlock feature 88 on the male connector 42 and secure the connectors 10, 42 against disconnection. In the illustrated embodiment, if the power source is activated to supply power to the first electrical contacts 14 before the female connector 10 and the male connector 42 are in proper engagement with one another, the actuator 18 will extend to a proud position relative to the female connector 10 and prevent the male connector 42 from being connected to the female connector 10 until the first electrical contacts 14 (and the actuator 18) are first de-energized.

As shown in FIG. 5B, while there is no electrical current transmitted between the first electrical contacts 14 and the power source (e.g., when the first electrical contacts 14 are de-energized), the actuator 18 is in the second or non-energized position. While in the second position, the actuator 18 permits the second electrical contacts 84 to engage and disengage the first electrical contacts 14. In the illustrated embodiment, the actuator 18 retracts to the second position away from the interlock feature 88 on the mating male connector 80.

In the illustrated embodiment, the actuator 18 is a solenoid 18 including a solenoid plunger 38 that is movable between the first position and second position. In other embodiments, the actuator may include a different type of device. While the first electrical contacts 14 receive electric current from a power source via the first conductive cord 22, the solenoid plunger 38 is energized to the first position, as shown in FIG. 5A. If the female connector 10 and the male connector 42 are in proper engagement at the time the power supply is activated, the solenoid plunger 38 (FIG. 5A) extends from the female connector 10 to engage the interlock feature 88 on the male connector 80 and secure the female connector 10 and male connector 80 against improper disconnection. On the other hand, activating the power source on the female connector 10 prior to properly connecting the female connector 10 and the male connector 42 will cause the plunger 38 to stand proud. The male connector 42 will therefore not fit in the female connector 10, thereby preventing the connectors 10, 42 from being connected together under a potential dangerous condition.

Figure 7:
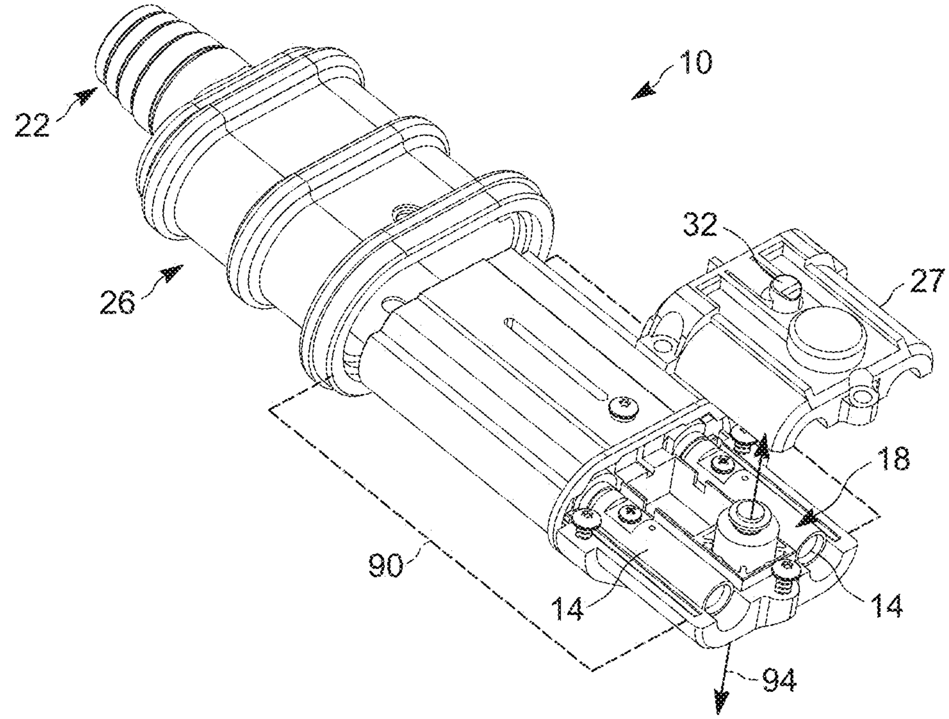
FIG. 7 is a partially exploded view of the female connector of FIG. 2.

As shown in FIG. 7, in the illustrated embodiment, the solenoid 18 is positioned between two first electrical contacts 14. A first insulator molding 27 and the first insulator housing 26 separate the first electrical contacts 14 from a surrounding environment. Each of the first electrical contacts 14 extend parallel to one another and are positioned in a plane 90. In the illustrated embodiment, the plunger 38 is oriented to move along an axis 94 that is normal or orthogonal relative to the plane 90. In other embodiments, the plunger 38 may be oriented at a different oblique angle other than perpendicular. As used herein, "oblique" refers to a non-parallel orientation (e.g., defining an angle between 0 degrees and 180 degrees). In other embodiments, the axis 94 can be oriented parallel to the plane 90 and/or the female connector can engage the male connector in a different manner.

Figure 8:
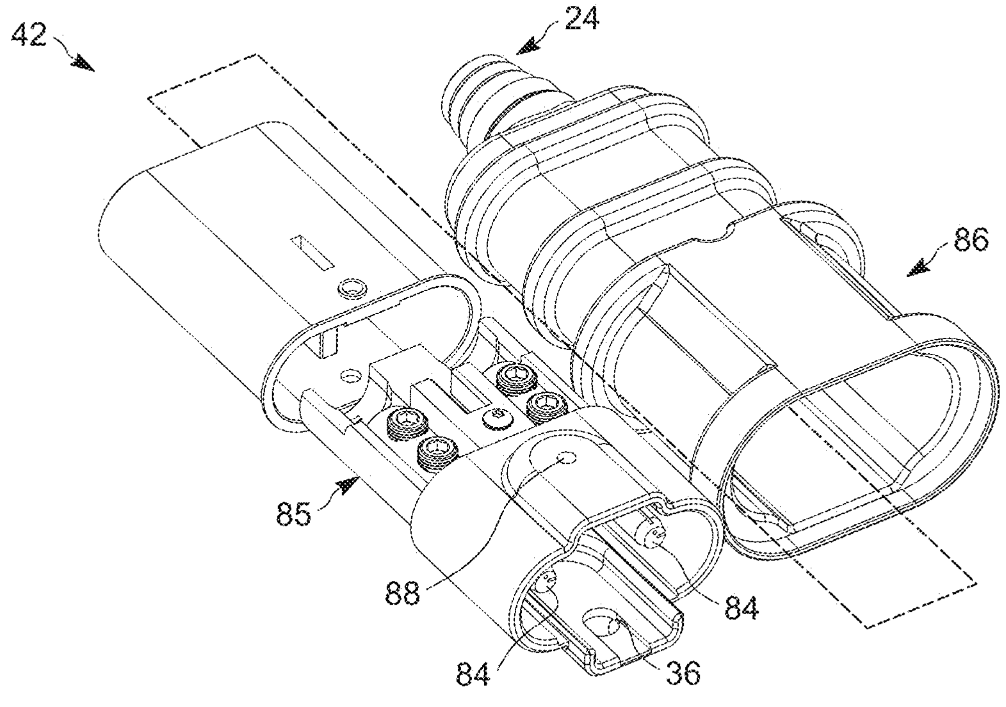
FIG. 8 is a partially exploded view of the male connector of FIG. 3.

As shown in FIG. 8, in the illustrated embodiment, the male connector 42 includes two second electrical contacts 84 positioned to engage the two first electrical contacts 14 (FIG. 7). A second insulator molding 85 and the second insulator housing 86 separate the second electrical contacts 84 from a surrounding environment. In the illustrated embodiment, the interlock feature 88 includes a hole 88 that engages at least a portion of the solenoid plunger 38 in the first position to prevent the female connector 10 and the male connector 80 from being separated or disconnected. If the plunger 38 is extended prior to properly connecting the female connector 10 and the male connector 42, the plunger 38 engages part of the male connector 42 (e.g., an edge 82 of the second insulator molding 85) and will not permit the second electrical contacts 84 to be inserted into the first electrical contacts 14. In other embodiments, the interlock feature 88 may be formed in a different manner and/or may engage the plunger 38 in a different manner.

In a successfully mated connector assembly 100 as shown in FIG. 4, the actuator 18 is in the second position and the second electrical contacts 84 fully engage the first electrical contacts 14. The latch 34 also mechanically secures the female connector 10 and the male connector 42 and provides a secondary manner for securing the connectors 10, 42, particularly before current is provided to the first electrical contacts 14. In the illustrated embodiment, the tab 32 positioned on the female connector 10 is positioned within the opening 36 on the male connector 42. Once the power source is activated and current is supplied to the first electrical contacts 14, the actuator 18 engages the interlock feature 88 (FIG. 5A), and the current is transmitted between the connectors 10, 42 through the engagement of the first and second electrical contacts 14, 84 to a load (not shown).

In some embodiments, an indicator (e.g., a light—not shown) may be positioned on one of the connectors 10, 42 to signify an electrical state of the mated connector assembly 100. In one embodiment, the indicator is a light-emitting diode, or LED, attached to the first insulator housing 26 of the female connector 10. The LED is in electrical communication with the actuator 18 and illuminates when the actuator 18 is in the first position, as shown in FIG. 5A. In other embodiments, the indicator is an LED attached to the second insulator housing 86 of the male connector 80, and is in electrical communication with the second electrical contact 84; the LED illuminates when the first electrical contacts 14 and second electrical contacts 84 are fully engaged and in electrical communication with the power source. An auxiliary circuit (e.g., FIGS. 21 and 22) may be incorporated to step-down the power from the electrical contacts before delivering current to the LED.

To properly connect the female connector 10 and the male connector 80, a user first verifies that a power source is not activated/supplying current to the female connector 10. If the power source is not activated, the female connector 10 and the male connector 80 may be connected to one another such that the first electrical contacts 14 engage the second electrical contacts 84. For example, the male connector 82 may be inserted toward the female connector 10 in a translational manner (e.g., parallel to the first plane 90—FIG. 7) until the first electrical contacts 14 receive the second electrical contacts 84 and the latch 34 mechanically secures the connectors 10, 42. Once connected, the power source may be energized to supply electrical current to the female connector 10, thereby driving the actuator 18 to move from a non-energized position to an energized position. The actuator 18 engages the interlock feature 88 of the male connector 80, thus securing the female connector 10 and the male connector 80 against disconnection.

To properly disconnect the female connector 10 and the male connector 80, the power source is first de-activated, thereby causing the actuator 18 to move from the energized position to the non-energized position and disengage the interlock feature 88 of the male connector 80. The latch 34 may be manually unlocked (e.g., by depressing the tab 32) and the female connector 10 and the male connector 80 may be separated from one another until the first electrical contacts 14 are completely disengaged from the second electrical contacts 84.

FIGS. 9-14 show a connector assembly 500 according to another embodiment. Features of the connector assembly 500 that are similar to features of the connector assembly 100 of FIGS. 1-8 are identified with similar reference numbers, plus 400. At least some differences between the connector assembly 400 and the connector assembly 100 are described in detail.

Figure 9:
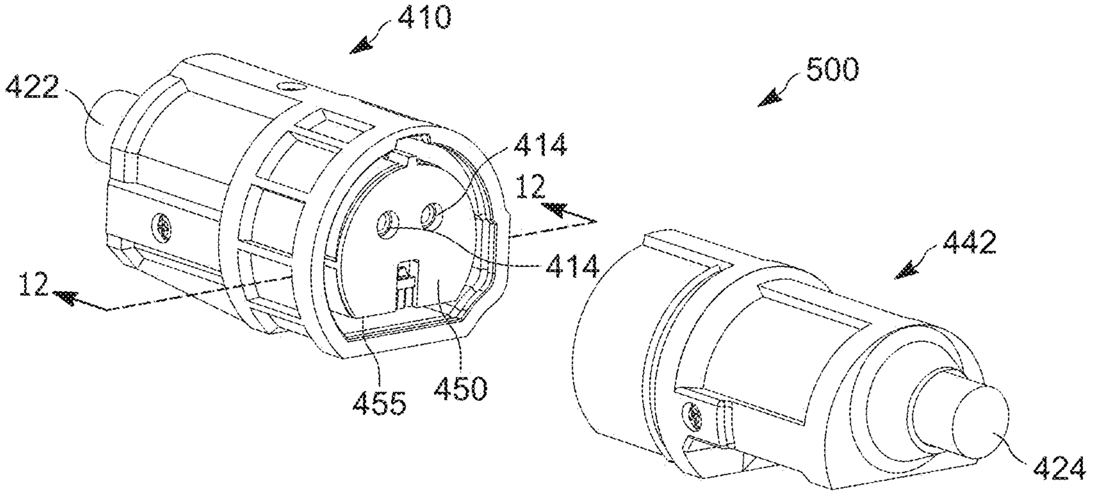
FIG. 9 is a perspective view of a connector assembly according to another embodiment, with a male connector and a female connector disconnected from one another.

As shown in FIG. 9, a female connector 410 includes a faceplate 450 having two openings aligned with first electrical contacts 414. In the illustrated embodiment, a portion of the perimeter of the faceplate 450 has a straight edge side 455. Likewise, a male connector 442 has a similar geometric shape so that a properly oriented male connector 480 may engage and electrically connect to the female connector 410. It should be understood that, in other embodiments, the connectors may have other geometric configurations. A first insulator housing 426 encloses the female connector 410 and a second insulator housing 486 encloses the male connector 442. The housings 426, 486 may assist in withstanding abuse and/or impact loads.

Figure 10:
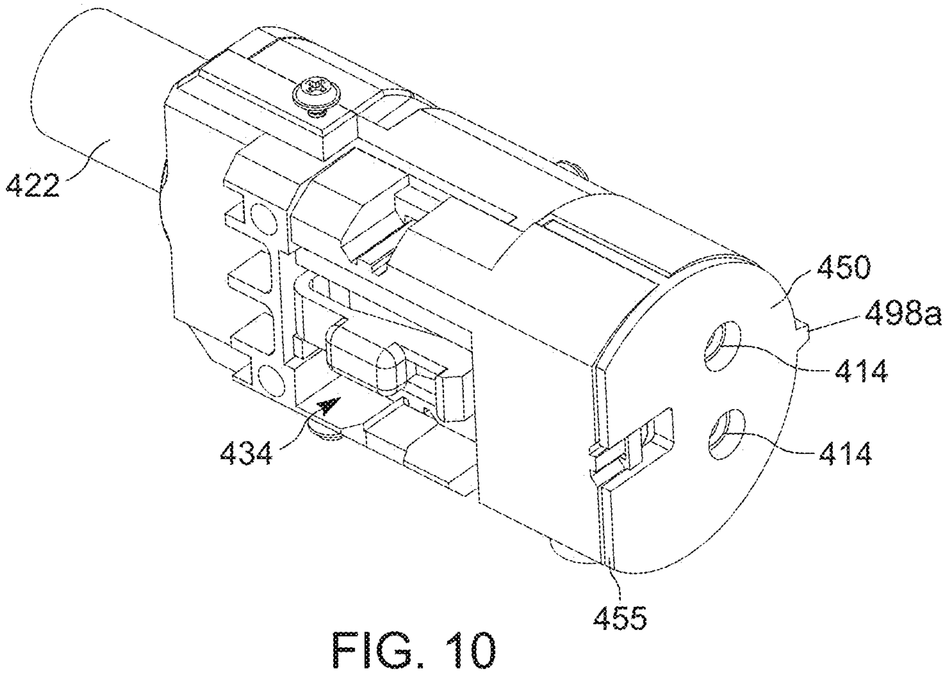
FIG. 10 is a perspective view of the female connector of FIG. 9, with an insulator housing removed.

Referring to FIG. 10, a mechanical latch 434 includes a cantilevered tab coupled to the female connector 410. Similar to the latch 34 described above with respect to FIGS. 1-8, the latch 434 can engage a corresponding feature on the mating connector (e.g., the male connector 442) to releasably secure the connectors 410, 442. In the illustrated embodiment, the latch 434 is aligned with the straight edge side 455 of the faceplate 450 relative to a direction along which the female connector 410 and male connector 442 are coupled together. In the illustrated embodiment, the latch 434 is resiliently biased away from the center of the female connector 410 and can be unlocked by depressing or pushing the latch 434 toward a center of the female connector 410.

Figure 11:
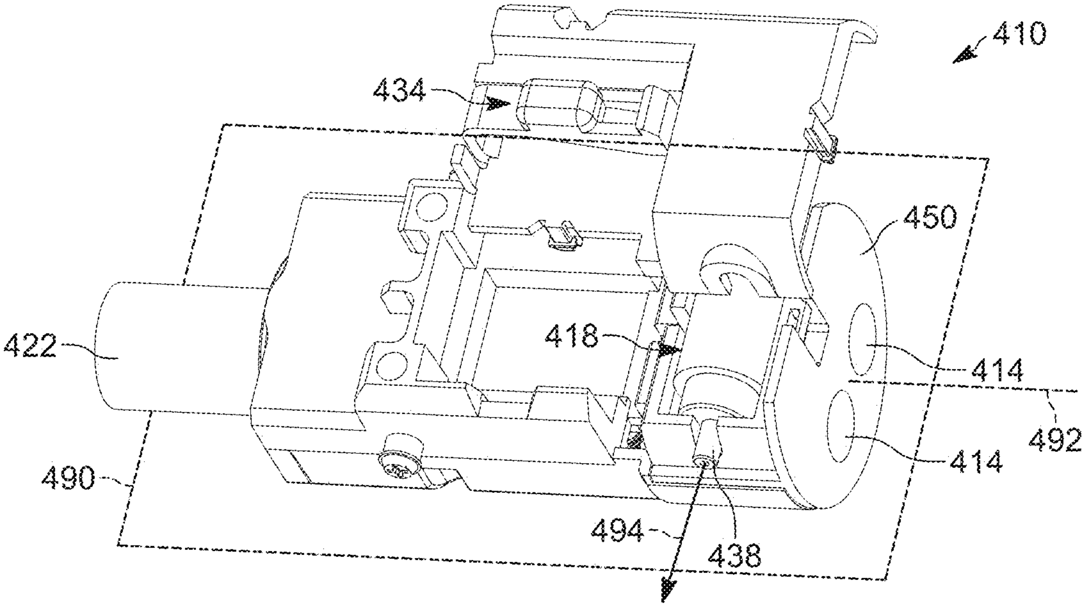
FIG. 11 is a partially exploded view of the female connector of FIG. 10.

As shown in FIG. 11, in the illustrated embodiment the actuator 418 includes a solenoid oriented in a direction transverse to a direction of connection between the male and female connectors 410, 442. The first electrical contacts 414 are parallel to one another and oriented in a plane 490, and the first electrical contacts 414 extend in a direction of connection 492. The solenoid 418 is oriented laterally or transversely with respect to the first electrical contacts 414 and is offset from the contacts 414 so that there is no interference between the contacts 414 and the solenoid 418. The solenoid 418 includes a plunger 438 oriented to move along an axis 494 that is parallel to the first plane 490 but not parallel (e.g., perpendicular) to the direction of connection 492 of the first contacts 414.

Figure 12:
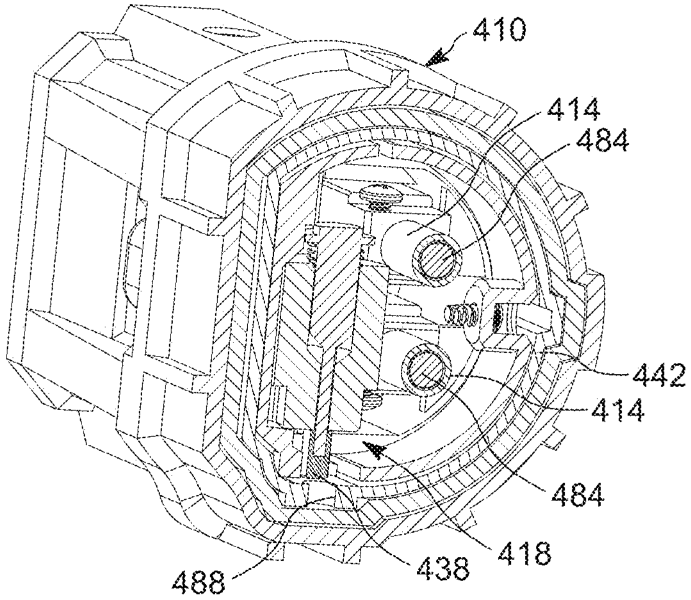
FIG. 12 is a cross-sectional view of the connector assembly of FIG. 9 viewed along section 9-9, with an actuator in a first position.

Similar to the connector assembly 100, the solenoid 418 prevents improper connection and disconnection of the female connector 410 to the male connector 442. As shown in FIG. 12, a plunger 438 of the solenoid 418 is in a second or non-energized position when there is no electrical current supplied to the first electrical contacts 414, thereby permitting the female connector 410 and male connector 442 to be connected and disconnected from each other under safe conditions. When the first electrical contacts 414 receive current from the power source (not shown), the solenoid 418 receives power (e.g., through the auxiliary circuit) and extends to the first position or energized position. If the male connector 442 was properly coupled to the female connector 410 prior to supplying the current to the first electrical contacts 414, the plunger 438 extends through the female connector 410 and engages an interlock feature 488 on the mating male connector 442, thereby securing the connectors 410, 442.

Figure 13:
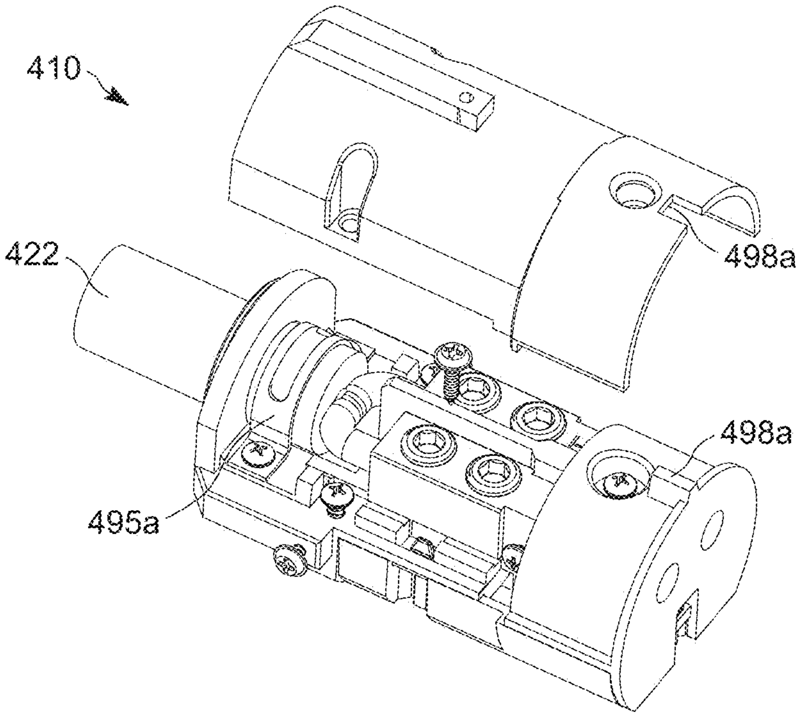
FIG. 13 is another partially exploded view of the female connector of FIG. 10.
Figure 14:
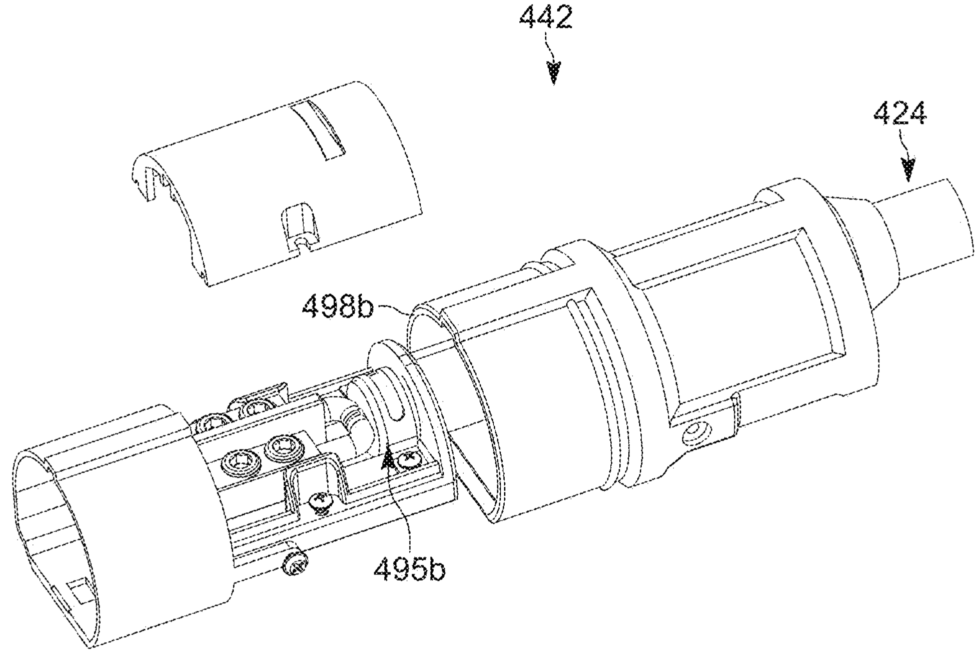
FIG. 14 is a partially exploded view of the male connector of FIG. 9.

As shown in FIGS. 13 and 14, the female connector 410 and male connector 442 may each include a strain relief clamp 495 and a polarizing rejection feature 498. Each strain relief clamp 495*a*, 495*b* can be a metallic component that fastens a conductive cord 422, 424 to a housing of the respective connector 410, 442. Other materials may also be used in other embodiments. Each strain relief clamp 495*a*, 495*b* reduces strain caused by stress on the conductive cord 422, 424 (e.g., stress due to tension, bending, or twisting of the cord) to inhibit the stress from being transmitted from the conductive cord 422, 424 to the respective electrical contacts 414, 484. Each strain relief clamp 495*a*, 495*b* can also prevent a wire conducting high voltages from being pulled out of its wiring terminal during use.

The polarizing rejection features 498*a*, 498*b* on the connectors 410, 442 may be configured as a shape and/or size that is unique to a particular class or grade of connectors in order to prevent the connection of mismatched connectors. For example, the polarizing rejection feature 498*a* of female connector 410 of one type/rating (e.g., a 60 Amp connector) may be different in shape and/or size from a polarizing rejection feature of a female connector of another type (e.g., a 100 Amp connector). The corresponding polarizing rejection feature 498*b* of the associated male connector 442 of the first type can be connected to the matching female connector 410, but would be prevented from connecting to a female connector 410 of another type.

FIGS. 15-18 relate to a connector assembly 900 including a female connector 805 configured to form an electromechanical connection with a male connector 855, according to another embodiment. At least some differences between the connector assembly 900 and the connector assembly 100 are described in detail.

Figure 15:
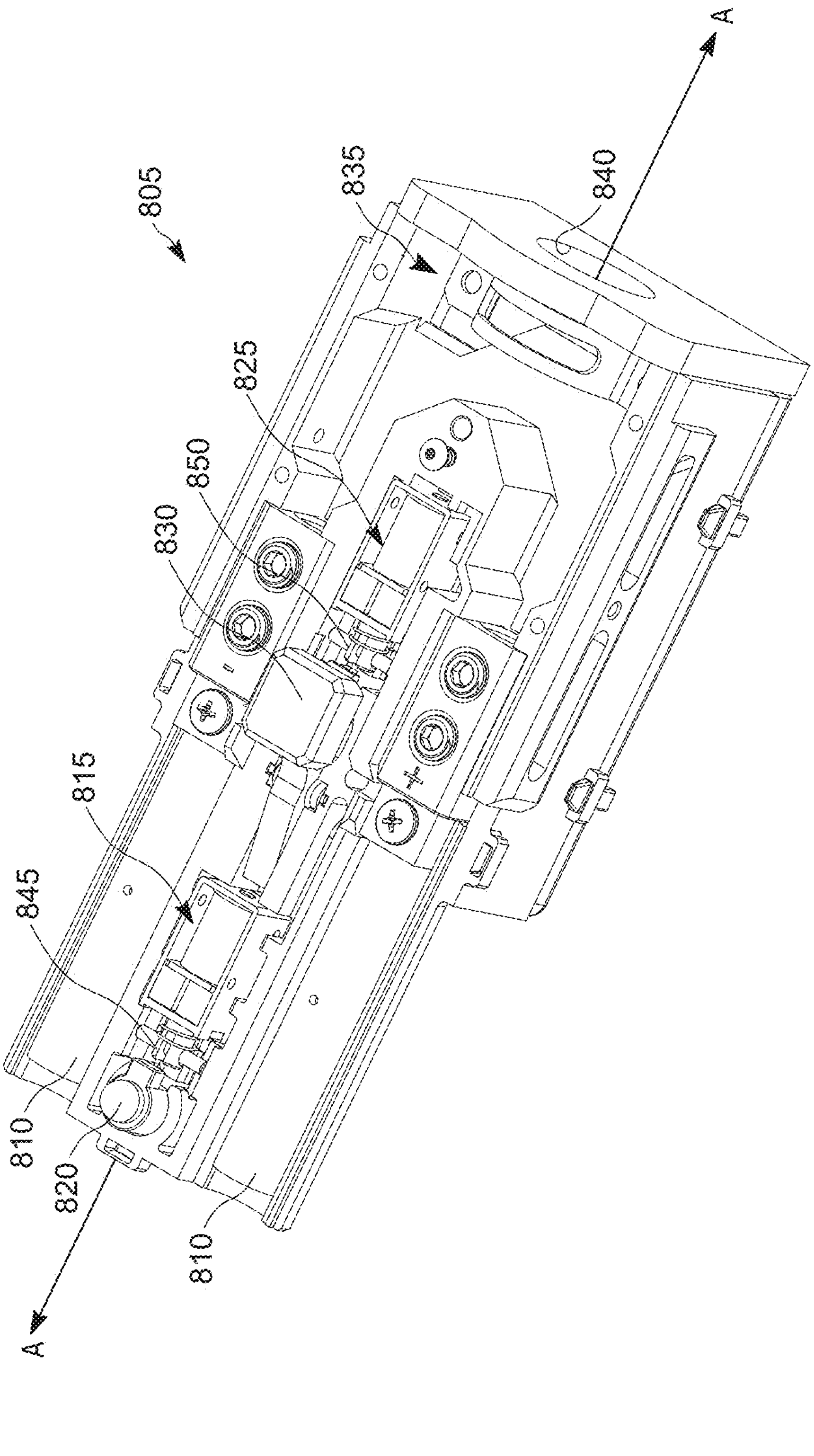
FIG. 15 is a perspective view of a female connector according to another embodiment, with an insulator housing removed.

Referring to FIG. 15, the female connector 805 of the connector assembly 900 includes, among other things, first electrical contacts 810, a first actuator 815, a first mechanical latch 820, a second actuator 825, a second mechanical latch 830, and a female strain relief clamp 835. The female strain relief clamp 835 secures a conductive cord carrying an electrical current to the female connector 805, the cord being inserted into the female connector 805 via opening 840. In the illustrated embodiment, the first actuator 815 and the second actuator 825 are electrically connected to the first electrical contacts 810 and receive electrical current therefrom via an auxiliary circuit (FIGS. 21 and 22) when the first electrical contacts 810 receive electrical current from a power source (not shown).

In the illustrated embodiment, the first actuator 815 includes a first plunger 845 oriented parallel to a longitudinal axis A of the female connector 805, and the second actuator 825 includes a second plunger 850 oriented parallel to the longitudinal axis A. The second plunger 850 and the first plunger 845 are aligned with one another in the illustrated embodiment. In other embodiments, the plungers 845, 850 may be positioned in parallel to one another, or may be oriented at a non-parallel angle with respect to each other. When in a first position (i.e., an energized position), the first plunger 845 engages the first mechanical latch 820, and the second plunger 850 engages the second mechanical latch 830, as described in further detail below.

Figure 16:
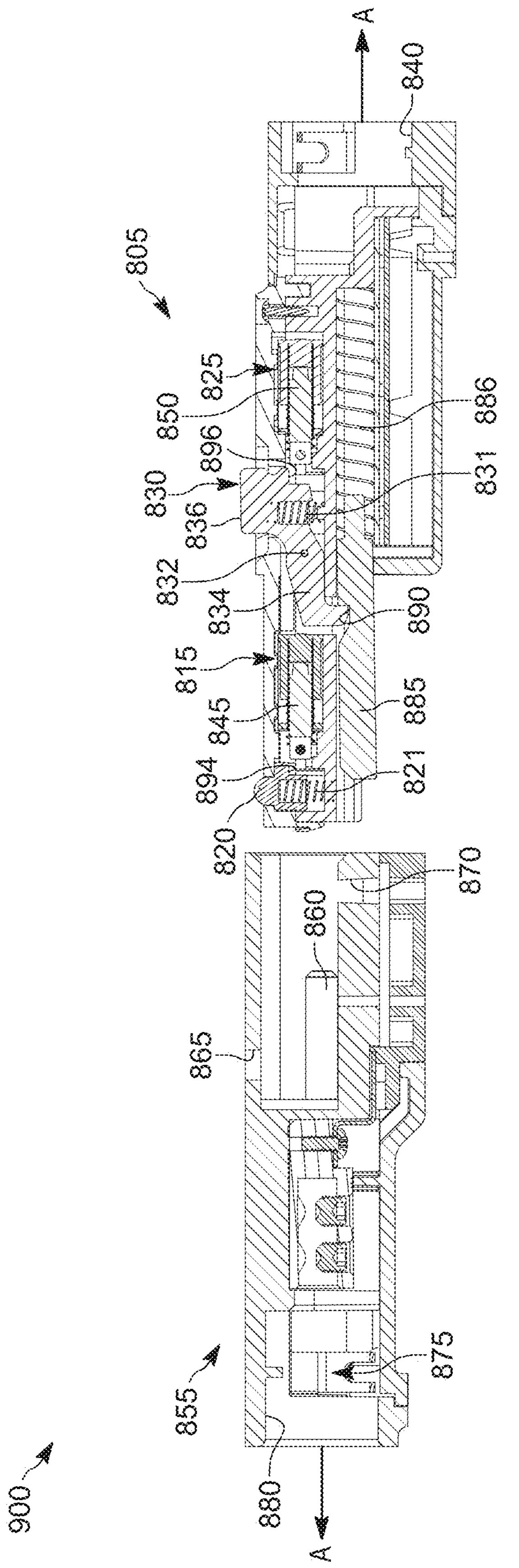
FIG. 16 is a cross-sectional view of a connector assembly including the female connector of FIG. 15 viewed along section 15-15, with a male connector and the female connector in a disconnected state.

Referring to FIG. 16, the male connector 855 includes, among other things, second electrical contacts 860 for engaging the first electrical contacts 810, a first interlock feature 865 for engaging the first mechanical latch 820, a second interlock feature 870 for engaging the second mechanical latch 830, and a male strain relief clamp 875. Like the female strain relief clamp 835, the male strain relief clamp 875 secures a conductive cord (not shown) positioned in an opening 880.

In the female connector 805, the first mechanical latch 820 is biased by a first spring 821, and the second mechanical latch 830 is biased by a second spring 831. In the illustrated embodiment, the first mechanical latch 820 is biased away from the longitudinal axis A, and the second mechanical latch 830 is supported for pivoting movement about a pin 832. The second mechanical latch 830 includes an arm 834 positioned on an opposite side of the pin 832 from a user-engagement surface 836, such that applying a force on the user-engagement surface 836 causes the arm 834 to pivot. The female connector 805 further includes an interlock latch or push-back latch 885 coupled to an interlock spring or push-back spring 886 exerting a biasing force on the push-back latch 885. In the illustrated embodiment, the push-back spring 886 biases the push-back latch 885 in a direction parallel to the longitudinal axis A, and toward an end of the female connector 805 that engages an end of the male connector 885. The push-back latch 885 includes a recess 890, and the arm 834 engages the recess 890 when the push-back latch 885 is in a relaxed position (e.g., when the push-back spring 886 is in a less compressed state). It is understood that other mechanical latches using different engagement mechanisms may be used in other embodiments.

The connector assembly 800 according to the embodiment of FIGS. 15-18 has at least three different states: 1) a disconnected state, 2) an unlocked connected state, and 3) a locked connected state.

In the disconnected state shown in FIG. 16, the female connector 805 is separated from the male connector 855, and the push-back latch 885 of the female connector 805 is in a relaxed position (i.e., an extended position). Accordingly, the first electrical contacts 810 (FIG. 15) do not engage the second electrical contacts 860. No electrical current passes through the connector assembly 800 to energize the first actuator 815 and the second actuator 825. The first plunger 845 and the second plunger 850 are not energized and are disengaged from the first mechanical latch 820 and the second mechanical latch 830, respectively (i.e., the plungers 845, 850 are retracted in the illustrated embodiment).

Figure 17:
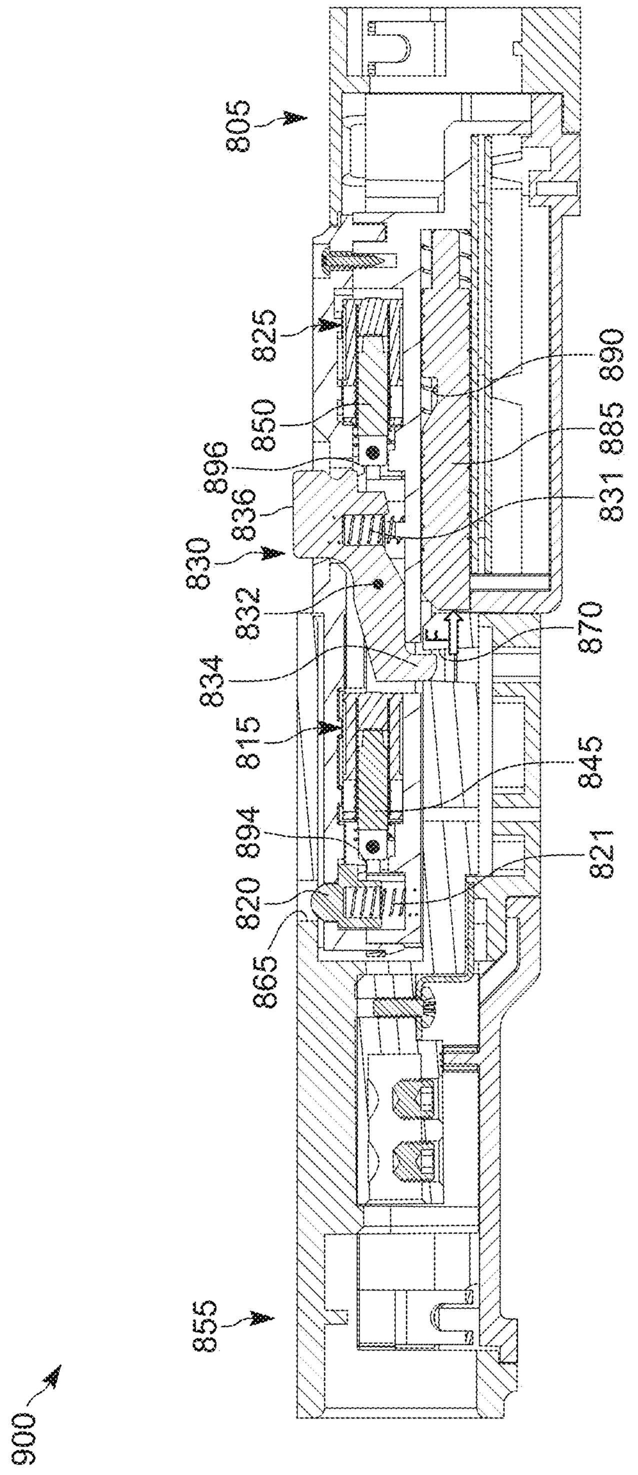
FIG. 17 is a cross-sectional view of the connector assembly of FIG. 16, with the male and female connectors in a connected state and actuators in a second position.

Referring to FIG. 17, in the unlocked connected state, the female connector 805 and male connector 855 engage one another, and the first electrical contacts 810 (FIG. 15) are in electrical communication with the second electrical contacts 860. In the illustrated embodiment, moving the connectors 805, 855 toward one another causes a portion of the male connector 855 to exert a force F on the push-back latch 885 against the biasing force of the push-back spring 886, causing the push-back latch 886 to move toward a retracted position. In addition, the first mechanical latch 820 may be depressed during insertion of the connectors 805, 855, and then may be biased by the spring 821 to engage the first interlock feature 865 (e.g., an opening). Similarly, the insertion may cause the second mechanical latch 830 to pivot about the pin 832 against the bias of the second spring 831 until the arm 834 reaches the second interlock feature 870, at which point the second mechanical latch 830 is biased by the spring 831 cause the arm 834 to engage the second interlock feature 870. The springs 821, 831 bias the mechanical latches 820, 830, respectively, to secure the connectors 805, 855 against disconnection.

Figure 18:
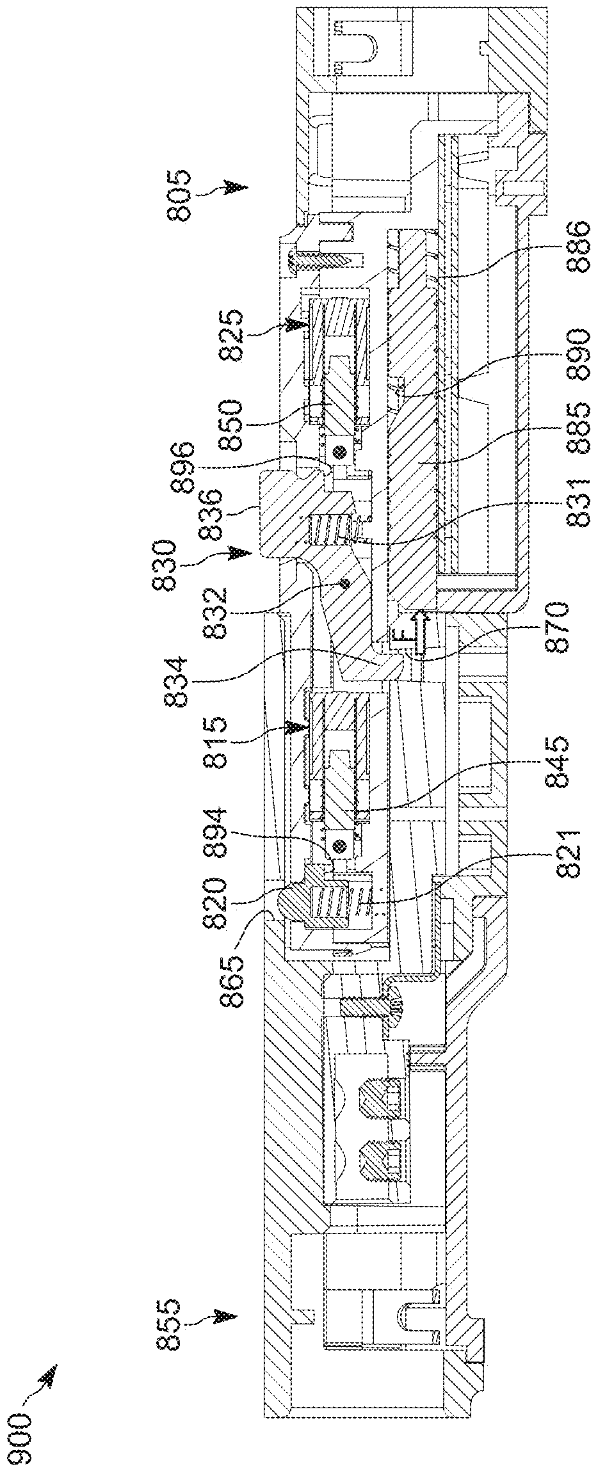
FIG. 18 is a cross-sectional view of the connector assembly of FIG. 16, with the male and female connectors in a connected state and actuators in a first position.

As shown in FIG. 18, when an external power source (not shown) is activated after the connectors 805, 855 are engaged, an electrical current can flow through the connector assembly 800. The power energizes the first actuator 815 and the second actuator 825, placing the connector assembly 800 in the locked connected state. In particular, the first plunger 845 and the second plunger 850 are energized to respective first positions or extended positions. In the first position of the first plunger 845, the first plunger 845 engages a ledge 894 of the first mechanical latch 820, 850 to prevent the first mechanical latch 820 from being disengaged (e.g., depressed) from the first interlock feature 865. Similarly, in the first position of the second plunger 850, the second plunger 850 engages a ledge 896 of the second mechanical latch 830 to prevent the second mechanical latches 830 from being disengaged (e.g., depressed) from the second interlock feature 870.

To disconnect the connector assembly 800, a user must first de-energize the current to the connector assembly 800 from the external power source. The lack of electrical current delivered to the first electrical contacts 810 de-energizes the first actuator 815 and the second actuator 825, causing the first plunger 845 and the second plunger 850 to relax or retract to second positions (FIG. 17) in which the plungers 845, 850 are disengaged from the ledges 894, 896, respectively. Subsequently, the mechanical latches 820, 830 can each be actuated to disengage from the interlock features 865, 870, respectively. When the mechanical latches 820, 830 are simultaneously actuated/depressed, the connectors 805, 855 may be separated from one another. In some embodiments, the push-back spring 886 may exert a biasing force (via the push-back latch 885) on the male connector 855 to separate the male connector 855 from the female connector 805.

If the external power source is activated prior to the connectors 805, 855 being coupled together, the first plunger 845 will be extended to engage the ledge 894 and the second plunger 850 will be extended to engage the ledge 896. As a result, the first mechanical latch 820 and the second mechanical latch 830 will be prevented from being depressed or pivoted, thereby preventing the connectors 805, 855 from being joined. The locking function insures that the female connector 805 and male connector 855 can only be connected and disconnected under safe, unpowered conditions and prevents a user from accidentally unlocking the mechanical latches 820, 830 while the connector assembly 800 is in electrical communication with the external power source.

Figure 19:
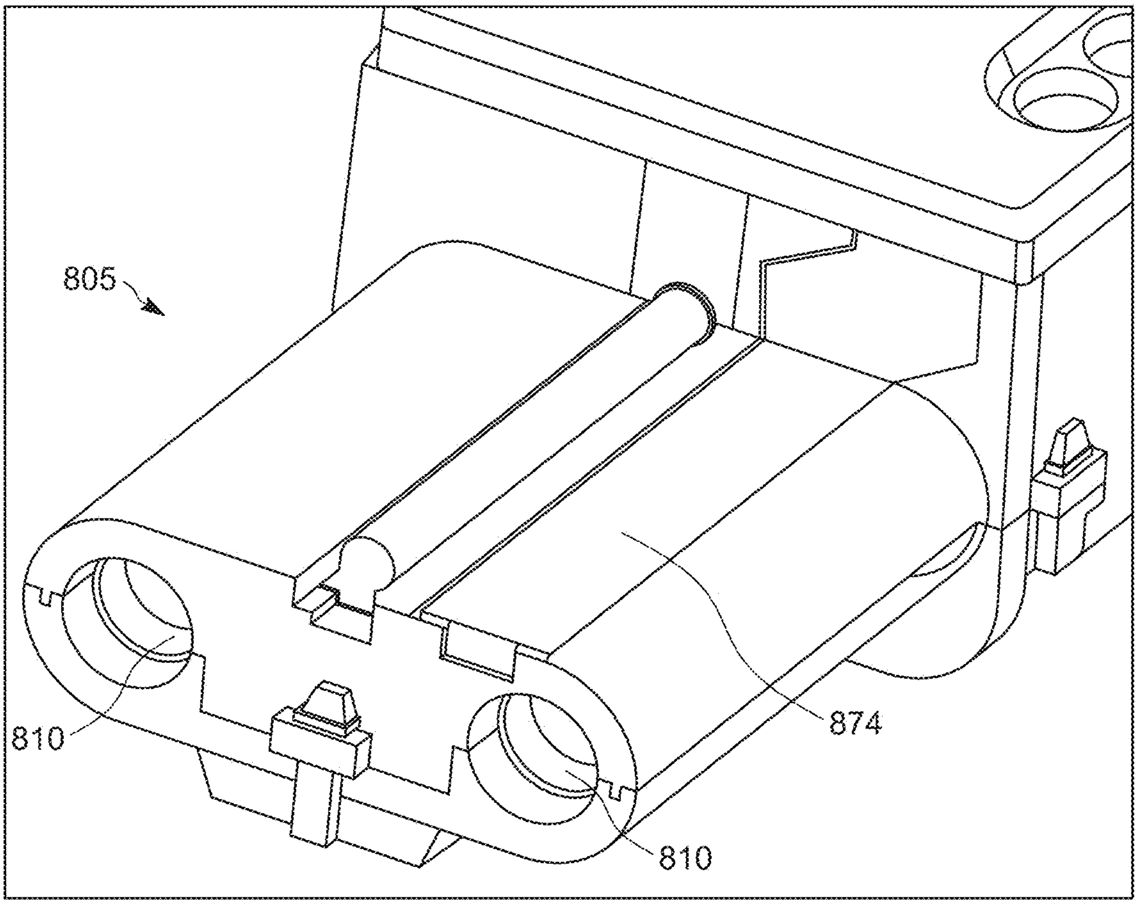
FIG. 19 is a perspective view of a female connector according to another embodiment.
Figure 20:
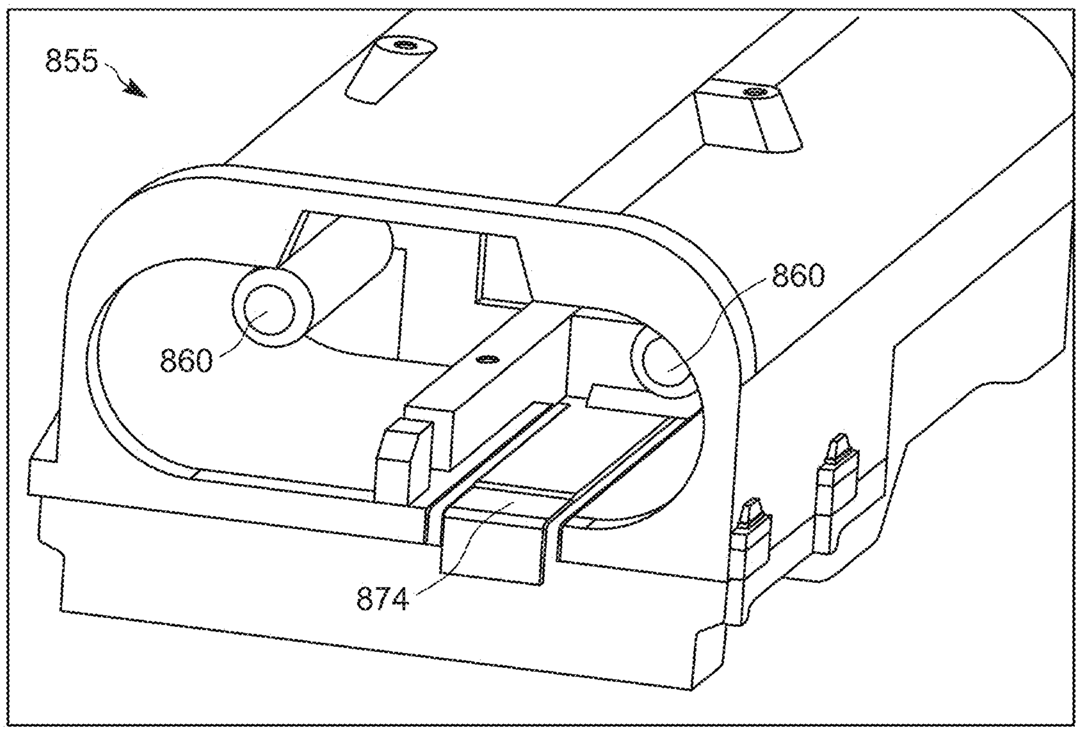
FIG. 20 is a perspective view of a male connector according to another embodiment.

Finally, as shown in FIGS. 19 and 20, in some embodiments the connectors 805, 855 may include grounding contacts or strips 874 that engage one another when the connectors are coupled together.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. An electrical connector assembly comprising:

a first electrical contact device including a first electrical contact, the first electrical contact configured to receive current from a power source;

a second electrical contact device including a second electrical contact, the second electrical contact device capable of receiving current from the first electrical contact device;

a connector coupled to the first electrical contract device and movable between a first connector position and a second connector position, the connector configured to selectively engage the second electrical contact device in the second connector position after the second electrical contact device is moved into engagement the first electrical contact, the engagement of the connector and the second electrical contact device secures the first electrical contact device and the second electrical contact device against disconnection; and an actuator movable between a first actuator position and a second actuator position, the actuator being in the first actuator position while the first electrical contact is in electrical communication with a power source, the actuator being in the second actuator position while the electrical communication between the first electrical contact and the power source is disconnected;

wherein movement of the actuator from the first actuator position to the second actuator position is configured to secure the connector in the second connector position; and wherein the actuator is configured to move between the first actuator position and the second actuator position along a first axis and wherein the connector is configured to move between the first connector position and the second connector position along a second axis that intersects with the first axis.

2. The electrical connector of claim 1, wherein the first electrical contact device is a female device that is configured to receive the second electrical contact device.

3. The electrical connector of claim 1, wherein the connector is biased toward the second connector position by a spring.

4. The electrical connector of claim 1, wherein the connector includes a ledge and the actuator configured to contact the ledge in the second actuator position to maintain the connector in the second connector position.

5. The electrical connector of claim 1, wherein the actuator is a plunger.

6. The electrical connector of claim 1, wherein the first axis is perpendicular to the second axis.

7. The electrical connector of claim 1, wherein the first electrical contact includes a plurality of electrical contacts extending parallel to a connection direction that is parallel to the first axis.

8. An electrical connector assembly comprising:

a first electrical contact device including a first electrical contact;

a second electrical contact device including a second electrical contact, the second electrical contact configured to form an electrical connection with the first electrical contact;

a connector coupled to the first electrical contract device and movable between a first connector position and a second connector position, the connector configured to selectively engage an interlock feature of the second electrical contact device in the second connector position after the second electrical contact device is moved along an insertion axis into engagement the first electrical contact, the engagement of the connector and the interlock feature secures the first electrical contact device and the second electrical contact device against disconnection; and an actuator movable between a first actuator position and a second actuator position, the actuator being in the first actuator position while the first electrical contact is in electrical communication with a power source, the actuator being in the second actuator position while the electrical communication between the first electrical contact and the power source is disconnected;

wherein movement of the actuator from the first actuator position to the second actuator position is configured limit movement of the connector toward the first connector position; and wherein the actuator is configured to move between the first actuator position and the second actuator position along the insertion axis and wherein the connector is configured to move between the first connector position and the second connector position along a second axis that intersects with the insertion axis.

9. The electrical connector assembly of claim 8, wherein the actuator is configured to move from the first actuator position to the second actuator position when electrical current is provided to the first electrical contact and the second electrical contact.

10. The electrical connector assembly of claim 8, wherein the first electrical contact device is a female device that is configured to receive the second electrical contact device.

11. The electrical connector assembly of claim 8, wherein the connector is biased toward the second connector position by a spring.

12. The electrical connector of claim 8, wherein the connector includes a ledge and the actuator configured to contact the ledge in the second actuator position to maintain the connector in the second connector position.

13. The electrical connector of claim 8, wherein the insertion axis is perpendicular to the second axis.

14. The electrical connector of claim 8, wherein the first electrical contact includes a plurality of electrical contacts extending parallel to a connection direction that is parallel to the insertion axis.

15. A method for selectively connecting a first electrical contact device and a second electrical contact device, the method comprising:

verifying that a power source is not in electrical communication with the first electrical contact device;

if the power source is not in electrical communication with the first electrical contact device, engaging electrical contacts of the first electrical contact device with electrical contacts of the second electrical contact device along a translational direction;

moving a connector along a connector axis from a first connector position to a second connector position while engaging the first electrical contact device with the second electrical contact device to secure the first electrical contact device to the second electrical contact device, wherein the connector axis intersects with the translational direction; and supplying electrical current from the power source and driving an actuator to move from a second actuator position to a first actuator position to retain the connector in the second connector position and securing the first electrical contact device and the second electrical contact device against disconnection, wherein the actuator moves along an actuator axis parallel to the translation direction.

16. The method of claim 15, wherein the connector is biased toward the second connector position, the method further comprising moving the connector against the bias from the second connector position toward the first connector position when initially engaging the first electrical contact device with the second electrical contact device.

17. The method of claim 15, wherein the actuator is a plunger.

18. The method of claim 15, wherein the connector axis and the actuator axis are perpendicular to one another.

19. The method of claim 15, further comprising:

selectively disconnecting the first electrical contact device and the second electrical contact device by, disconnecting the power source causing the actuator to move from the first actuator position to the second actuator position to disengage from the connector;

manually moving the connector against the bias toward the first connector position to allow disconnection of the first electrical contact device and the second electrical contact device; and pulling the first electrical contact device away from the second electrical contact device in the translational direction until electrical contacts of the first electrical contact device are fully disengaged from electrical contacts of the second electrical contact device.

20. The method of claim 15, further comprising supplying electrical current from the power source to the first electrical contact device independent of the second electrical contact device.

* * * * *